United States Patent
Li et al.

(10) Patent No.: US 10,780,839 B2
(45) Date of Patent: Sep. 22, 2020

(54) TELESCOPIC MECHANISM

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Xi-Hang Li, Zhengzhou (CN); Zheng-Hu Jiang, Zhengzhou (CN); Hui Ju, Zhengzhou (CN); Yan-Fang Yan, Zhengzhou (CN)

(73) Assignees: HONGFUJIN PRECISION ELECTRONICS (ZHENGZHOU) CO., LTD., Zhenghou (CN); HON HAI PRECISION INDUSTRY CO., LTD., New Taipei (TW)

( * ) Notice: Subject to any disclaimer, the term of this patent is extended or adjusted under 35 U.S.C. 154(b) by 127 days.

(21) Appl. No.: 16/215,908

(22) Filed: Dec. 11, 2018

(65) Prior Publication Data

US 2020/0001799 A1 Jan. 2, 2020

(30) Foreign Application Priority Data

Jun. 29, 2018 (CN) .......................... 2018 1 0712086

(51) Int. Cl.
*B60R 11/02* (2006.01)
*F16M 11/04* (2006.01)
*B60R 11/00* (2006.01)

(52) U.S. Cl.
CPC ....... *B60R 11/0241* (2013.01); *F16M 11/041* (2013.01); *B60R 2011/0064* (2013.01); *B60R 2011/0085* (2013.01)

(58) Field of Classification Search
CPC ......... B60R 11/0241; B60R 2011/0064; B60R 2011/0085; F16M 11/041
See application file for complete search history.

(56) References Cited

U.S. PATENT DOCUMENTS

2017/0219333 A1* 8/2017 Tang ................... G01B 9/02029
2017/0252792 A1* 9/2017 Kronauer ................... F16P 7/00

* cited by examiner

*Primary Examiner* — Nguyen T Vo
(74) *Attorney, Agent, or Firm* — ScienBiziP, P.C.

(57) ABSTRACT

A telescopic mechanism includes a mounting base, a telescopic block received within the mounting base, and a pushing rod received within the mounting base. The telescopic block is vertically arranged in the mounting base, and the pushing rod is horizontally arranged in the mounting base. The telescopic block defines a guiding channel. The pushing rod passes through the guiding channel. The pushing rod is driven through the guiding channel to cause the telescopic block to extend or retract relative to the mounting base.

12 Claims, 4 Drawing Sheets

100

TELESCOPIC MECHANISM

FIELD

The subject matter herein generally relates to a telescopic mechanism.

BACKGROUND

Generally, during transport of objects by auto-guided vehicles, the objects need to be secured in place. In mobile phones, because of narrow space within the mobile phone, opening and closing of a chip card storage box of the mobile phone may be a problem.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
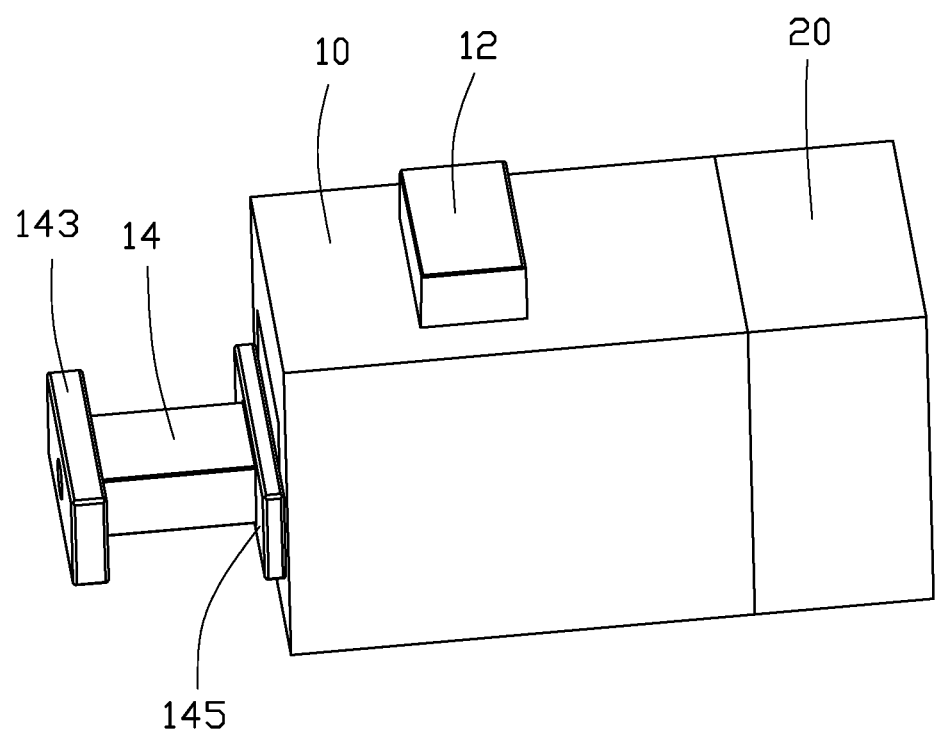
FIG. 1 is an assembled, isometric view of an embodiment of a telescopic mechanism in accordance with the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a telescopic mechanism 100 including a mounting base 10, a telescopic block 12, and a pushing rod 14. The telescopic block 12 and the pushing rod 14 are received within the mounting base 10. The telescopic block 12 is received vertically within the mounting base 10, and the pushing rod 14 is received horizontally within the mounting base 10. The pushing rod 14 can be driven by a force applied by a user to cause the telescopic block 12 to protrude out of or retract within the mounting base 10. In one embodiment, the mounting base 10 further includes a power unit 20 located adjacent a rear end of the mounting base 10. The power unit 20 can also drive the pushing rod 14 to protrude out of a front end of the mounting base 10. In other words, besides the telescopic mechanism 100 relying on the force applied by a user to drive the pushing rod 14, the power unit 20 also provides a unidirectional force on the pushing rod 14 to push the pushing rod 14 out of the front end of the mounting base 10. For example, the telescopic mechanism 100 including the power unit 20 may be used for opening and closing a chip card storage box of a smart mobile phone. The power unit 20 causing the pushing rod 14 to protrude out of the front end of the mounting base 10 drives the telescopic block 12 to extend out of a top surface of the mounting base 10, which can cause the chip card storage box to close. A user can push the pushing rod 14 to drive the pushing rod 14 into the mounting base 10 to drive the telescopic block 12 to retract within the mounting base 10 to release closure of the chip card storage box, thereby opening the chip card storage box. Thus, a simple structure can solve the problems in the prior art related to narrow space within a smart mobile phone.

Figure 2:
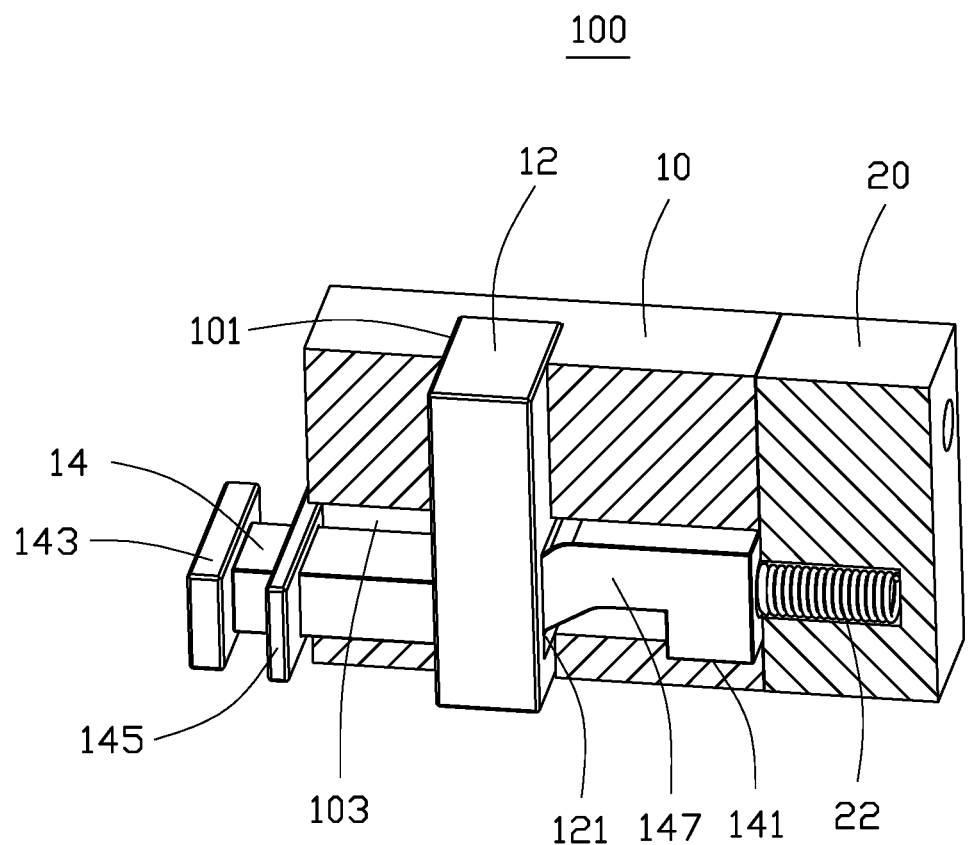
FIG. 2 is a cutaway view of the telescopic mechanism of FIG. 1.

In FIG. 2, the mounting base 10 defines a first pathway 101 and a second pathway 103. The first pathway 101 and the second pathway 103 are substantially perpendicular to each other and intersect each other. The first pathway 101 extends through an upper and lower surface of the mounting base 10, and the second pathway 103 extends through a front and rear end of the mounting base 10. The telescopic block 12 is received within the first pathway 101, and the pushing rod 14 is received within the second pathway 103. Additionally, the telescopic block 12 defines a guiding channel 121. The pushing rod 14 passes through the guiding channel 121 of the telescopic block 12. The guiding channel 121 of the telescopic block 12 is located at a junction between the first pathway 101 and the second pathway 103. The power unit 20 is located adjacent the rear end of the mounting base 10. The power unit 20 faces the pushing rod 14. The power unit 20 drives the pushing rod 14 to protrude out of the front end of the mounting base 10 (shown in FIG. 3). In one embodiment, the pushing rod 14 includes a hooked end 141, a pushing end 143, and a positioning block 147. The hooked end 141 is located adjacent to the rear end of the mounting base 10, the pushing end 143 is located adjacent to the front end of the mounting base 10, and the positioning block 147 is located between the hooked end 141 and the pushing end 143. The positioning block 147 is configured to pass through the guiding channel 121 of the telescopic block 12. The power unit 20 includes a resilient member 22 facing the hooked end 141. A force applied by the resilient member 22 drives the pushing rod 14 to cause the pushing end 143 to protrude out of the front end of the mounting base 10. Thus, the pushing end 143 is pushed to drive the positioning block 147 relative to the guiding channel 121, and the hooked end 141 hooks onto the telescopic block 12 to prevent the pushing rod 14 from falling out of the mounting base 10. The hooked end 141 is substantially "L" shaped. When the pushing rod 14 moves through the second pathway 103, the hooked end 141 hooks onto the telescopic block 12 to retain the pushing rod 14 within the second pathway 103, thereby preventing the pushing rod 14 from falling out of the mounting base 10 (shown in FIG. 3).

The pushing rod 14 further includes a guiding block 145 located on an outer periphery of the pushing rod 14. The guiding block 145 is located outside of the front end of the second pathway 103. The guiding block 145 limits movement of the pushing rod 14 within the second pathway 103. Thus, the pushing rod 14 can only be moved within a defined path along the second pathway 103. In at least one embodiment, the resilient member 22 of the power unit 20 is an extension spring. The force applied by the resilient member 22 to the hooked end 141 of the pushing rod 14 pushes the pushing rod 14 to protrude out of the front end of the mounting base 10 (shown in FIG. 3). A force applied by a user to the pushing end 143 of the pushing rod 14 causes the pushing rod 14 to move within the second pathway 103 toward the rear end of the mounting base 10, and the hooked end 141 compresses the resilient member 22. Thus, the compressed resilient member 22 retains a restoring force. When the force applied on the pushing end 143 is removed, the restoring force of the resilient member 22 pushes the pushing rod 14 to move toward the front end of the mounting base 10. The movement of the pushing rod 14 through the second pathway 103 causes the positioning block 147 to move relative to the guiding channel 121, thereby causing movement of the telescopic block 12. In detail, when the mounting base 10 includes the power unit 20 on the rear end of the mounting base 10, the pushing rod 14 can be moved back and forth by the forces applied to the pushing end 143 and the hooked end 141 of the pushing rod 14, thereby causing the positioning block 147 to move relative to the guiding channel 121. Therefore, the telescopic block 12 is driven to protrude and retract through the upper surface of the mounting base 10.

Figure 3:
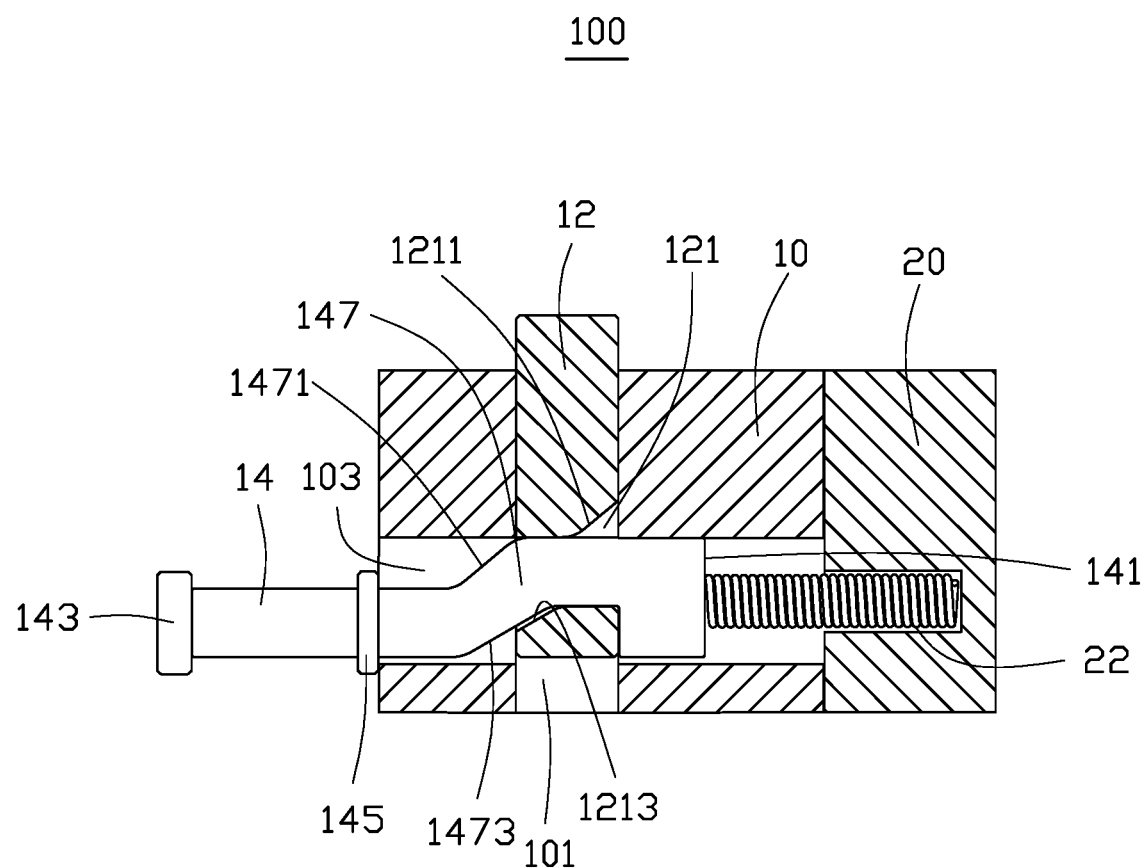
FIG. 3 is a cross-sectional view of the telescopic mechanism in FIG. 1.

As shown in FIG. 3, the positioning block 147 includes a first positioning surface 1471 and a second positioning surface 1473. The first positioning surface 1471 is located on an upper surface of the positioning block 147, and the second positioning surface 1473 is located on a lower surface of the positioning block 147. The guiding channel 121 of the telescopic block 12 includes a first guiding surface 1211 and a second guiding surface 1213. The first guiding surface 1211 and the first positioning surface 1471 face each other and are adjacent to the upper surface of the mounting base 10. The second guiding surface 1213 and the second positioning surface 1473 face each other and are adjacent to the lower surface of the mounting base 10. The first positioning surface 1471 and the second positioning surface 1473 of the positioning block 147 are slanted outer surfaces of the positioning block 147. Two ends of each of the slanted outer surfaces of the positioning block 147 are flat outer surfaces adjacent to the front end and the rear end of the mounting base 10, respectively. The first guiding surface 1211 and the second guiding surface 1213 of the telescopic block 12 are inner surfaces of the telescopic block 12. The first guiding surface 1211 faces the rear end of the mounting base 10, and the second guiding surface 1213 faces the front end of the mounting base 10.

In at least one embodiment, the first positioning surface 1471 and the second positioning surface 1473 are outer surfaces of the positioning block 147 and extend upwards from the front end of the mounting base 10 to the back end of the mounting base 10. The first guiding surface 1211 and the second guiding surface 1213 are inner surfaces of the telescopic block 12, and both include a flat inner surface and a slanted inner surface. The slanted inner surface of the first guiding surface 1211 stretches upward from the front end of the mounting base 10 to a back end of the mounting base 10, and the slanted inner surface of the second guiding surface 1213 stretches downward from the back end of the mounting base 10 to the front end of the mounting base 10. The first positioning surface 1471 is configured to face the first guiding surface 1211, and the second positioning surface 1473 is configured to face the second guiding surface 1213. Thus, when the pushing rod 14 moves relative to the guiding channel 121, the first positioning surface 1471 and the second positioning surface 1473 cooperate with the first guiding surface 1211 and the second guiding surface 1213 to drive the telescopic block 12 to protrude and retract relative to the upper surface of the mounting base 10.

FIG. 3 shows the pushing rod 14 being pushed by the resilient member 22 of the power unit 20 to drive the pushing rod 14 to protrude out of the front end of the mounting base 10. The hooked end 141 hooking onto the telescopic block 12 retains the pushing rod 14 within the second pathway 103. The flat outer surfaces and the slanted outer surfaces of the positioning block 147 correspond to the flat inner surfaces and the slanted inner surfaces of the guiding channel 121, respectively, so that when the pushing rod 14 moves within the second pathway 103, the telescopic block 12 is protruded out of the upper surface of the mounting base 10. Furthermore, the flat outer surface of the first positioning surface 1471 adjacent to the back end of the mounting base 10 contacts with the flat inner surface of the first guiding surface 1211. The flat outer surface of the second positioning surface 1473 adjacent to the back end of the mounting base 10 contacts with the flat inner surface of the second guiding surface 1213. A portion of the slanted outer surface of the second positioning surface 1473 contacts with the slanted inner surface of the second guiding surface 1213. That is, three surfaces of the pushing rod 14 contact with three surfaces of the telescopic block 12 to ensure steady contact with each other.

When a force is applied on the pushing end 143 of the pushing rod 14, the pushing rod 14 is moved toward the rear end of the mounting base 10, such that the second positioning surface 1473 slides relative to the second guiding surface 1213, and the telescopic block 12 is retracted within the mounting base 10. The outer surface of the positioning block 147 (the second positioning surface 1473) faces and slides along the inner surface of the guiding channel 121 (the second guiding surface 1213), and then the outer surface of the positioning block 147 (the first positioning surface 1471) faces and slides along the inner surface of the guiding channel 121 (the first guiding surface 1211) to drive the telescopic block 12 to move within the first pathway 101.

Figure 4:
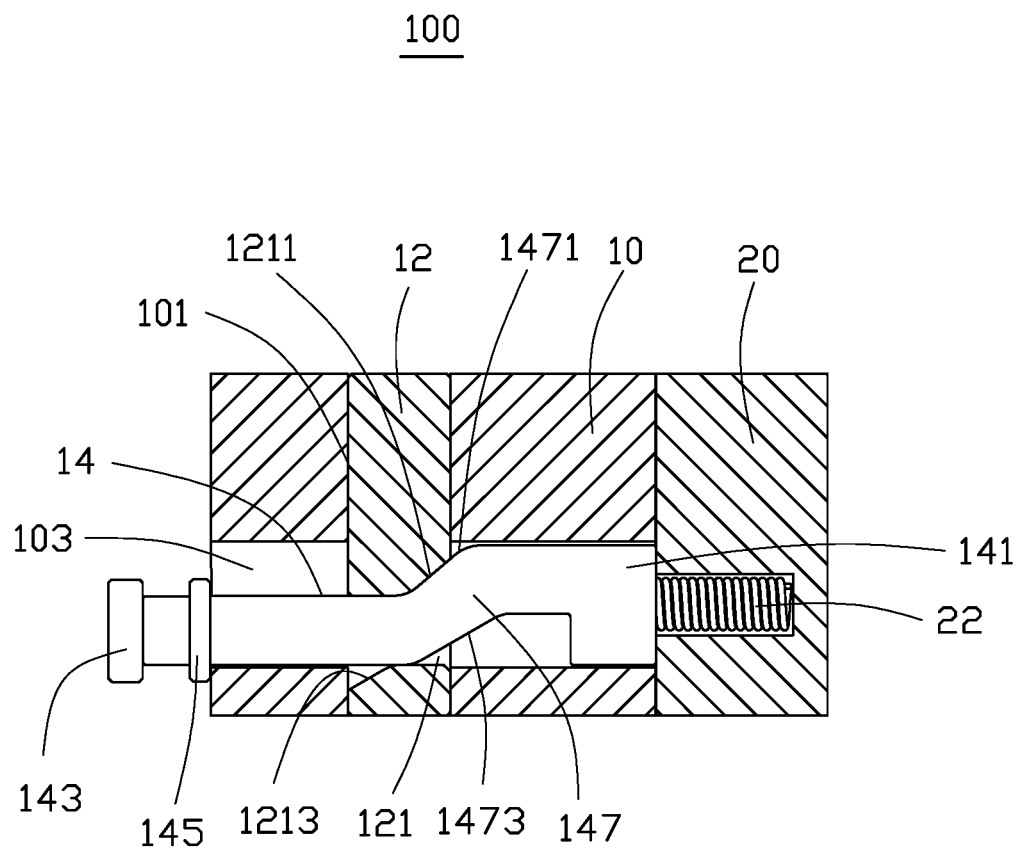
FIG. 4 is a cross-sectional view of the telescopic mechanism in FIG. 2.

In FIG. 4, pressure is applied by the pushing end 143 of the pushing rod 14 to drive displacement of the push rod 14 within the second tunnel 103 toward the rear end of the mounting base 10 to reach the position as shown in FIG. 4. The flat outer surface of the first positioning surface 1471 adjacent to the front end of the mounting base 10 faces the flat inner surface of the first guiding surface 1211, and the slanted outer surface of the first positioning surface 1471 faces the slanted inner surface of the first guiding surface 1211. Moreover, the flat outer surface of the second positioning surface 1473 adjacent to the front end of the mounting base 10 faces the flat inner surface of the second guiding surface 1213, so that the telescopic block 12 abuts the three surfaces of the pushing rod 14. The three surfaces of the telescopic block 12 in contact with the three surfaces of the pushing rod 14 drive the telescopic block 12 to stably retract into the mounting base 10. Then, when the pressure applied by the pushing end 143 of the pushing rod 14 is removed, a decompression force of the resilient member 22 drives the pushing rod 14 to move toward the front end of the mounting base 10. First, a sliding displacement of the inclined outer surface of the first positioning surface 1471 and the inclined inner surface of the first guiding surface 1211 drives the telescopic block 12 to move upward in the first pathway 101. Then, the inclined outer surface of the second positioning surface 1473 abuts the inclined inner surface of the second guiding surface 1213, so that the telescopic block 12 continuously moves upward in the first pathway 101. Finally, the flat outer surface of the first positioning surface 1471 adjacent to the rear end of the mounting block 10 abuts the flat inner surface of the first guiding surface 1211, and the telescopic block 12 is protruded from the mounting base 10 again. (as shown in FIG. 3).

In some embodiments, the power unit 20 may be omitted, so that only an external force applied on the pushing rod 14 by a user causes the pushing rod 14 to move within the second pathway 103. The telescopic mechanism 100 may be used on a frame of an auto guided vehicle (AGV). In use, the telescopic mechanism 100 is mounted outside of the frame of the AGV, so that the pushing end 143 of the pushing rod 14 is positioned on an outer side of the AGV. When the AGV transports an object, the pushing end 143 is pulled out of the mounting base 10 by a user to cause the telescopic block 12 to protrude out of the upper surface of the mounting base 10 (shown in FIG. 3). Thus, the object transported by the AGV is transported securely. When the object is transported to an unloading destination, the pushing end 143 is pressed to drive the telescopic block 12 to retract within the mounting base 10. Thus, the object can be unloaded conveniently.

The telescopic mechanism 100 uses the pushing rod 14 passing through the guiding channel 121 of the telescopic block 12 to drive the telescopic block 12 to protrude or retract within the mounting base 10 to conveniently secure and unload an object.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A telescopic mechanism comprising:
a mounting base;
a telescopic block received within the mounting base and vertically arranged in the mounting base; and
a pushing rod received within the mounting base and horizontally arranged in the mounting base;
wherein the telescopic block defines a guiding channel;
wherein the pushing rod passes through the guiding channel;
wherein a force applied to the pushing rod drives the pushing rod through the guiding channel to cause the telescopic block to extend or retract relative to the mounting base.

2. The telescopic mechanism of claim 1, wherein the mounting base defines a first pathway and a second pathway; the first pathway is perpendicular to and intersects the second pathway; the first pathway extends through an upper and lower surface of the mounting base, and the second pathway extends through a front and rear end of the mounting base.

3. The telescopic mechanism of claim 2, wherein the telescopic block is received within the first pathway, and the pushing rod is received within the second pathway; and the guiding channel of the telescopic block is located at a junction between the first pathway and the second pathway.

4. The telescopic mechanism of claim 3, wherein the pushing rod comprises a hooked end, a pushing end, and a positioning block; the hooked end is located at a rear end of the mounting base; the pushing end is located at a front end of the mounting base; the positioning block is located between the hooked end and the pushing end; and the positioning block is positioned to pass through the guiding channel of the telescopic block.

5. The telescopic mechanism of claim 4, wherein an end of the pushing end protrudes out of the front end of the mounting base; the pushing end drives the positioning block to move through the guiding channel; and the hooked end retains the pushing rod within the mounting base by hooking onto the telescopic block.

6. The telescopic mechanism of claim 5, wherein the mounting base further comprises a power unit located adjacent the rear end of the mounting base; the power unit faces the hooked end of the pushing rod; the power unit applies a force to the pushing rod that drives the pushing rod to protrude out of the front end of the mounting base.

7. The telescopic mechanism of claim 6, wherein the power unit comprises a resilient member facing the hooked end; the resilient member drives the pushing rod to protrude out of the front end of the mounting base.

8. The telescopic mechanism of claim 4, wherein the pushing rod comprises a guiding block located on an outer periphery of the pushing rod; the guiding block is located outside of the front end of the second pathway.

9. The telescopic mechanism of claim 4, wherein the positioning block of the pushing rod comprises a first positioning surface and a second positioning surface; the first positioning surface is located on an upper surface of the positioning block, and the second positioning surface is located on a lower surface of the positioning block.

10. The telescopic mechanism of claim 9, wherein the guiding channel of the telescopic block comprises a first guiding surface and a second guiding surface; the first guiding surface and the first positioning surface face each other and are adjacent to the upper surface of the mounting base; and the second guiding surface and the second positioning surface face each other and are adjacent to the lower surface of the mounting base.

11. The telescopic mechanism of claim 10, wherein the first positioning surface and the second positioning surface of the positioning block are slanted outer surfaces of the positioning block; the first guiding surface and the second guiding surface of the telescopic block are inner surfaces of the telescopic block; the first guiding surface faces the rear end of the mounting base, and the second guiding surface faces the front end of the mounting base.

12. The telescopic mechanism of claim 11, wherein two ends of each of the slanted outer surfaces of the positioning block are flat outer surfaces adjacent to the front end and the rear end of the mounting base; and three surfaces of the pushing rod contact with three surfaces of the telescopic block.

* * * * *